US008357739B2

(12) United States Patent
Huang et al.

(10) Patent No.: US 8,357,739 B2
(45) Date of Patent: Jan. 22, 2013

(54) LOW FLUORIDE THERMOPLASTIC COMPOSITION, METHOD OF MANUFACTURE AND PRODUCT MADE THEREFROM

(75) Inventors: Xin Huang, Shanghai (CN); Tong Sun, Shanghai (CN); Huagui Yang, Shanghai (CN); David Xiangping Zou, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 1012 days.

(21) Appl. No.: 11/609,094

(22) Filed: Dec. 11, 2006

(65) Prior Publication Data

US 2008/0139719 A1    Jun. 12, 2008

(51) Int. Cl.
*C08K 5/098* (2006.01)
*C08K 3/22* (2006.01)
*C08L 27/12* (2006.01)

(52) U.S. Cl. ........ 524/394; 524/425; 524/433; 524/436; 524/520; 524/544; 524/545; 524/546; 364/148

(58) Field of Classification Search ............... 524/394, 524/425, 433, 436, 544, 545, 546, 520
See application file for complete search history.

(56) References Cited

U.S. PATENT DOCUMENTS

| | | | | |
|---|---|---|---|---|
| 5,304,422 A | * | 4/1994 | Tanabe et al. | 428/392 |
| 5,489,640 A | | 2/1996 | Riding | |
| 5,773,500 A | * | 6/1998 | Reichmann | 524/410 |
| 6,780,944 B1 | * | 8/2004 | Miura et al. | 525/537 |
| 6,977,280 B2 | * | 12/2005 | Lee et al. | 525/199 |
| 7,878,594 B2 | * | 2/2011 | Fukuzawa et al. | 297/362 |
| 2004/0262581 A1 | | 12/2004 | Rodrigues | |
| 2005/0014003 A1 | * | 1/2005 | Takei et al. | 428/407 |
| 2005/0143508 A1 | | 6/2005 | Tyagi et al. | |
| 2006/0142455 A1 | | 6/2006 | Agarwal et al. | |

FOREIGN PATENT DOCUMENTS

| | | |
|---|---|---|
| EP | 0269950 A2 | 6/1988 |
| EP | 0269950 A3 | 6/1988 |
| EP | 1593712 A1 | 11/2005 |
| JP | 612750 A | 1/1986 |
| JP | 09087533 A * | 3/1997 |
| JP | 2000038513 A * | 2/2000 |
| WO | WO 9411429 A1 * | 5/1994 |

OTHER PUBLICATIONS

Machine translation of JP 09-087533 A, Mar. 31, 1997.*
Machine translation of JP 2000-038513 A, Feb. 8, 2000.*
Patent Abstracts of Japan, Publication No. 61002750 Publication Date Aug. 1, 1986, Application No. 59124343, Application Date Jun. 15, 1984.

* cited by examiner

*Primary Examiner* — Vickey Nerangis
(74) *Attorney, Agent, or Firm* — Cantor Colburn LLP

(57) ABSTRACT

A thermoplastic composition that includes a base polymer, a fluoropolymer, and a fluoride scavenger having suitable fluoride levels such that use in the electronics industry is appropriate. An extrusion method may be used for making the thermoplastic composition. The compositions may then be used to form a molded article. The composition has lower fluoride levels as compared to thermoplastic compositions without the fluoride scavenger making it suitable for use in electronic applications, as well as medical or food or beverage applications where fluoride ions are a concern.

15 Claims, No Drawings

LOW FLUORIDE THERMOPLASTIC COMPOSITION, METHOD OF MANUFACTURE AND PRODUCT MADE THEREFROM

FIELD OF THE TECHNOLOGY

The present invention is directed to thermoplastic compositions, and in particular, to low fluoride thermoplastic compositions, methods of manufacture, and articles derived therefrom.

BACKGROUND OF THE INVENTION

Thermoplastic polymers used in the internal components of hard disk drives should be capable of varying operating temperatures. In particular, the thermoplastic components should capable at operating temperatures of above 150° C. Also, moving parts within the hard disk drive, for example, latches, require a self-lubricating material with a reduced coefficient of friction. Blends of a thermoplastic polymer such as polyetherimide and polytetrafluoroethylene are capable at varying operating temperatures. Additionally, blends of polyetherimide and polytetrafluoroethylene have a low friction factor. There are, however, disadvantages associated with the polymer blend.

Polytetrafluoroethylene (PTFE) is a typical additive for thermoplastics. It is used to provide materials with good wear performance and a low coefficient of friction. Polytetrafluoroethylene micro powders are typically generated through direct polymerization. Directly polymerized PTFE has a strong tendency to fibrillate under shearing at room temperature because crystallization is initiated above the glass transition temperature of 17° C. Typically, directly polymerized PTFE is treated with radiation to lower the molecular weight and improve handling. Typical leachable fluoride levels measured by Ion Chromatography (IC) for directly polymerized PTFE are several ug/g while the levels for irradiated PTFE might be several hundred ug/g. The fluoride ion level will be even higher after compounding or injection molding, where process temperatures may exceed 340° C., the point at which polytetrafluoroethylene begins to degrade.

The typical compounding and molding process temperatures for polyetherimide may be as high as 370° C., which may present a problem for polytetrafluoroethylene, because as previously mentioned, it begins to degrade at temperatures above 340° C. Due to this degradation, the fluoride ion level of the final product after processing could be up to several hundred ug/g more than normal. Fluoride ions are a main concern for compounds used in the semiconductor industry. Industry specifications for fluoride ions, as tested by leachable ionic chromatography, require the levels be no higher than 40 ug/cm$^2$, or about 40 ug/g. As a result, the fluoride levels for irradiated polytetrafluoroethylene do not meet the required specifications.

A typical method utilized to reduce the fluoride levels of molded parts is to perform a rinse with deionized water, after molding. However, ultrasonic water washing is an additional process used to clean the part after molding in order to reduce the ionic level on the surface. This additional step may add to the process cost and increase the leadtime to molders. This process is not suitable for parts with metal inserts, as the fluoride ion will attack the metal surface. Another method to control the level of fluoride generated during compounding is to reduce the process temperature, preferably below 340° C. Unfortunately, even with the reduced process temperature, there is still the risk of the polytetrafluoroethylene being exposed to temperatures higher than 340° C. during the downstream process, for example during molding. As a result, the polytetrafluoroethylene will still generate higher levels of fluoride ions.

Another approach to reduce fluoride levels is to use non-irradiated, directly polymerized polytetrafluoroethylene for compounding. This non-irradiated version of polytetrafluoroethylene is effective in controlling the fluoride level to several ug/g, which is lower than irradiated polytetrafluoroethylene. However, although the fluoride levels are lower with non-irradiated polytetrafluoroethylene, the cost of handling non-irradiated polytetrafluoroethylene micro powder is high.

Accordingly, there is a need to reduce the fluoride level of compounds containing irradiated polytetrafluoroethylene. These compounds are beneficially able to withstand the compounding or molding process temperatures as well as a downstream deionized water or water based solvent washing process. At the same time, it would be beneficial for the compounds to maintain leachable fluoride levels lower than the industry specification. In addition, it would be beneficial to provide a thermoplastic composition suitable for use in the internal components of hard disk drives, as well as medical or food or beverage applications requiring controllable fluoride levels.

BRIEF SUMMARY OF THE INVENTION

A thermoplastic composition is disclosed. The composition includes a base polymer, a fluoropolymer, and a fluoride scavenger having suitable fluoride levels such that use in the electronics industry is appropriate. The composition has lower fluoride levels as compared to thermoplastic compositions not containing the fluoride scavenger. This makes the composition suitable for use in electronic applications, as well as medical or food or beverage applications where fluoride ions are a concern. Additionally, a method for making the thermoplastic composition into a molded article is also disclosed.

Accordingly, in one aspect, the present invention provides a composition that includes a base polymer, a fluoropolymer, and a fluoride scavenger.

In another aspect, the present invention provides a method of making a thermoplastic polymer composition. The method includes extruding a blend of the base polymer, fluoropolymer, and fluoride scavenger and then quenching the blend in a bath of deionized water. The extrudate is then pelletized and molded into standard test bars.

DETAILED DESCRIPTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

Disclosed herein are low fluoride blends of a base thermoplastic resin, a fluoropolymer such as polytetrafluoroethylene, and a fluoride scavenger that may be used in applications where low fluoride levels are beneficial. The blends include a thermoplastic polymer such as polyimide, polyphenylene sulfide, polyphenylene ether, polyethersulfone, polysulfone, polyaramid, polyetheretherketone, polycarbonate, polyphenylene oxide, polyester, polyamide, polystyrene, polyolefin, and blends of the foregoing resins. The blends also include a fluoropolymer such as polytetrafluoroethylene, a fluoride scavenger, and optional fillers including carbon (such as powder or fiber), glass (such as fiber, flakes, beads, etc.), aramid fillers, including powder and fibers, or mineral fillers along with stabilizers. The stabilizers may optionally include a flame retardant, an impact modifier, a process additive, and/or a mold release agent. A compounding process is generally used to produce the thermoplastic blends. A molding process is generally used to manufacture articles from the thermoplastic blend. The ability to obtain low fluoride level thermoplastic compositions permits articles manufactured from these blends/resins to be utilized in applications wherein higher operating temperatures are encountered and/or low fluoride levels are beneficial, such as for use in hard disk drive components. Additional uses include articles manufactured from these blends that are capable of being utilized in medical or food or beverage applications. In addition, these compositions may be used in applications wherein lower operating temperatures are used, again provided that lower fluoride levels are beneficial.

Accordingly, in one aspect, the present invention uses a thermoplastic polymer. The thermoplastic polymer is provided as the base substrate. In one embodiment, the thermoplastic polymer is a higher HDT polymer such that the resulting composition may be used in environments having higher operating temperatures. Examples of these polymers include, but are not limited to, polyimide, polyphenylene sulfide, polyphenylene ether, polyethersulfone, polysulfone, polyetheretherketone, polycarbonate, polyphenylene oxide, polyester, polyamide, and blends including one or more of the foregoing polymers. In alternative embodiments, the thermoplastic polymer is a lower HDT polymer such as a polystyrene or a polyolefin.

In one exemplary embodiment, the thermoplastic polymer is a polyimide. Useful thermoplastic polyimides have the general formula (I)

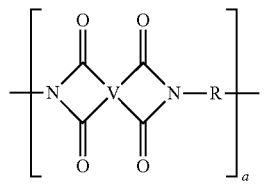

wherein a is greater than or equal to about 10 in one embodiment, and, in another embodiment, greater than or equal to about 1000; and wherein V is a tetravalent linker without limitation, as long as the linker does not impede synthesis or use of the polyimide. Suitable linkers include (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, epoxides, amides, esters, and combinations thereof. Exemplary linkers include but are not limited to tetravalent aromatic radicals of formula (II), such as

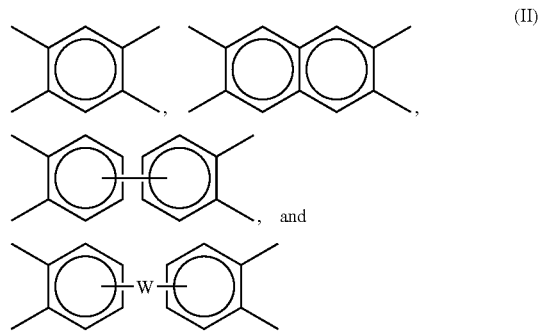

wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III).

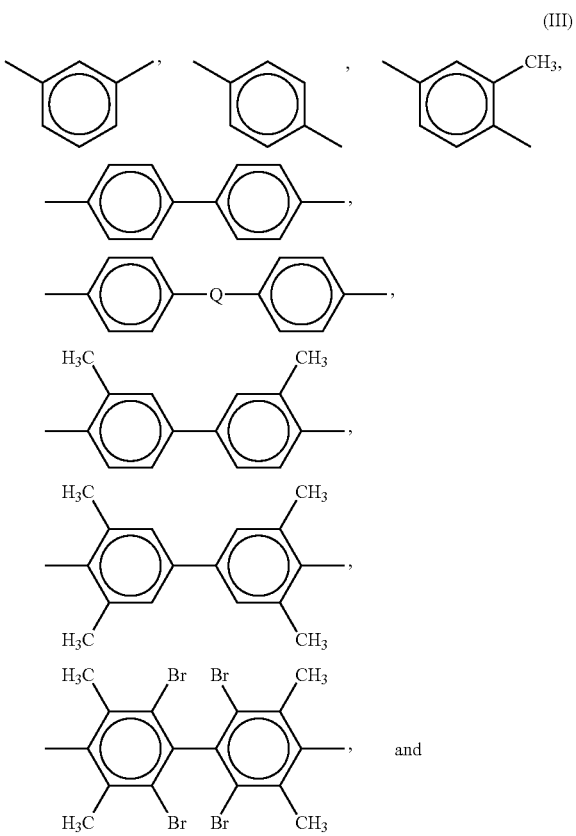

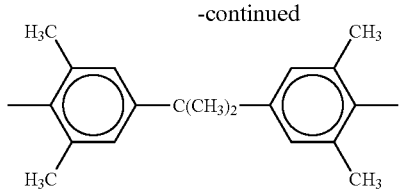

R in formula (I) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (IV)

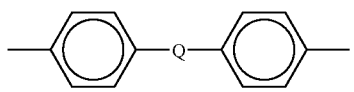
(IV)

wherein Q includes a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups.

Beneficial classes of polyimides that may be used in the compositions include polyamidimides and polyetherimides, particularly those polyetherimides that are melt processable.

Exemplary polyetherimide polymers include, in one embodiment more than 1, and in an alternative embodiment about 10 to about 1000 or more, and, in still another alternative embodiment, about 10 to about 500 structural units, of the formula (V)

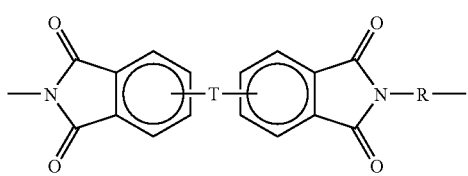
(V)

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited to, divalent radicals of formula (III) as defined above.

In one embodiment, the polyetherimide may be a copolymer, which, in addition to the etherimide units described above, further contains polyimide structural units of the formula (VI)

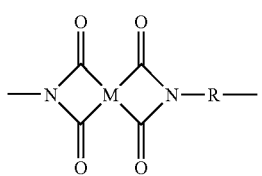
(VI)

wherein R is as previously defined for formula (I) and M includes, but is not limited to, radicals of formula (VII).

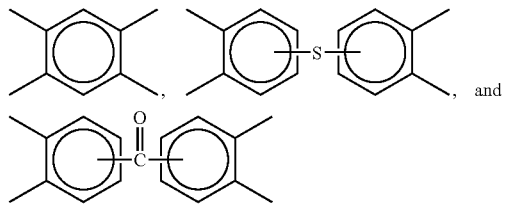
(VII)

The polyetherimide can be prepared by any of the methods including the reaction of an aromatic bis(ether anhydride) of the formula (VIII)

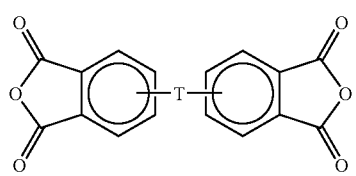
(VIII)

with an organic diamine of the formula (IX)

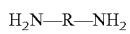
H$_2$N—R—NH$_2$ (IX)

wherein T and R are defined as described above in formulas (I) and (IV).

Illustrative examples of aromatic bis(ether anhydride)s of formula (VIII) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A beneficial class of aromatic bis(ether anhydride)s included by formula (VIII) above includes, but is not limited to, compounds wherein T is of the formula (X)

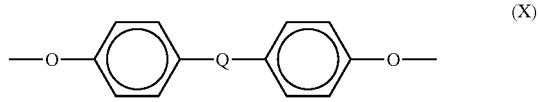
(X)

and the ether linkages, for example, are beneficially in the 3,3', 3,4', 4,3', or 4,4' positions, and mixtures thereof, and where Q is as defined above.

Any diamino compound may be employed in the preparation of the polyimides and/or polyetherimides. Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis (p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether and 1,3-bis(3-aminopropyl) tetramethyldisiloxane. Mixtures of these compounds may also be present. In one embodiment, the diamino compounds are aromatic diamines, especially m- and p-phenylenediamine and mixtures thereof.

In an exemplary embodiment, the polyetherimide resin includes structural units according to formula (V) wherein each R is independently p-phenylene or m-phenylene or a mixture thereof and T is a divalent radical of the formula (XI).

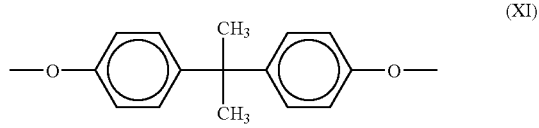

(XI)

Generally, useful polyetherimides have a melt index of about 0.1 to about 10 grams per minute (g/min), as measured by American Society for Testing Materials (ASTM) D1238 at 295° C., using a 6.6 kilogram (kg) weight. In one embodiment, the polyetherimide resin has a weight average molecular weight (Mw) of about 10,000 to about 150,000 grams per mole (g/mole), as measured by gel permeation chromatography, using a polystyrene standard. Such polyetherimide polymers typically have an intrinsic viscosity greater than about 0.2 deciliters per gram (dl/g), beneficially about 0.35 to about 0.7 dl/g measured in m-cresol at 25° C.

In one exemplary embodiment, the composition also includes a self-lubricating polymer. The self-lubricating polymer is provided in the composition to enhance the wear properties of any article that includes the composition. Any self-lubricating material capable of being used with the thermoplastic polymer may be used in the present invention. In one embodiment, the self-lubricating polymer is a fluoropolymer, such as a tetrafluoroethylene polymer. Suitable tetrafluoroethylene polymers for use in the technology described herein typically have a fibril structure, which tends to stabilize the polymer under molten conditions. The tetrafluoroethylene polymers are commercially available or can be prepared by conventional means. They are normally solids which are obtained, for example, by polymerizing tetrafluorethylene in aqueous media in the presence of a free radical catalyst at a pressure of from about 100 to about 1,000 psi and at a temperature of from about 0° C. to about 200° C. The tetrafluoroethylene polymers can be added to the thermoplastic resin composition in any manner known to the skilled artisan including addition as a direct solid, addition as a concentrate with a resin such as polycarbonate or SAN, or addition as aqueous tetrafluoroethylene polymer. Tetrafluoroethylene polymers are also referred to as PTFE.

In addition to the thermoplastic polymer and the self-lubricating polymer, the compositions of the present invention also include a fluoride scavenger. The fluoride scavenger is provided to catch fluoride ions as residue from the irradiation process on a tetrafluoroethylene polymer and further generated from the thermal degradation of the tetrafluoroethylene polymer during processing of the composition. Beneficially, the fluoride scavenger is also capable of maintaining reduced levels of fluoride during subsequent process steps and/or without adversely affect the properties of the thermoplastic composition. As a result, in one embodiment, the compositions of the present invention, after compounding, have a fluoride level of 40 ug/g or less. In another embodiment, the compositions of the present invention, after compounding, have a fluoride level of 20 ug/g or less. In still another embodiment, the compositions of the present invention, after compounding, have a fluoride level of 10 ug/g or less.

In one embodiment, the fluoride scavenger includes a long chain organic calcium salt, such as but not limited to, calcium stearate.

In another embodiment, the fluoride scavenger includes calcium oxide or calcium carbonate.

In still another embodiment, the fluoride scavenger includes minerals and/or mineral fibers containing calcium oxide, calcium carbonate, or mixtures thereof.

In addition to the thermoplastic polymer, the self-lubricating polymer and the fluoride scavenger, the compositions may include one or more additives depending on the selected properties of the thermoplastic composition. Other additives that may be used in the present invention include, but are not limited to, impact modifiers, flame retardants, stabilizers, mold release agents, fillers, anti-static agents, flow promoters, pigments, dyes, or the like, commonly used in thermoplastic compositions may also be added in the amounts selected.

Examples of additives, such as fillers, that may be used include, but are not limited to, minerals, mineral fibers, glass fibers, glass flakes, glass beads, mineral fillers, conductive carbon powder, carbon fiber, aramid powder or fibers and the like, or a combination containing at least one of the foregoing additives.

Examples of flame retardants include, but are not limited to, halogenated flame retardants, like tetrabromo bisphenol A oligomers such as BC58 and BC52, brominated polystyrene or poly(dibromo-styrene), brominated epoxies, decabromodiphenyleneoxide, pentabrombenzyl acrylate monomer, pentabromobenzyl acrylate polymer, ethylene-bis(tetrabromophthalimide, bis(pentabromobenzyl)ethane, metal hydroxides like Mg(OH)2 and Al(OH)3, melamine cyanurate, phosphor based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N—(N'-benzylaminocarbonyl) sulfanylimide potassium salt, or a combination containing at least one of the foregoing. Fillers and additives may be added in amounts ranging from 0.1 to about 40% by weight percent of the total composition.

Suitable mold releasing agents include for example, stearyl stearate, pentaerythritol tetrastearate, or the like, or combinations including at least one of the foregoing mold release agents. Mold releasing agents are generally used in amounts of from 0.1 to 1.0 parts by weight, based on 100 parts by weight of the total composition, excluding any additives.

In one embodiment, the compositions including the fluoride scavenger show mechanical and wear properties that are substantially similar to a composition that does not include the fluoride scavenger. In select embodiments, the compositions including the fluoride scavenger are capable of meeting the cleanliness specifications required for use in electronic components. In still other embodiments, the compositions may be used for molded parts containing a metal insert, such as stainless steel. As a result of the significantly reduced fluoride level in the resulting compositions and/or articles, the metal surface is not attacked by fluoride ions as are compositions without the fluoride scavenger. In yet another embodiment, the compositions may be used for medical applications or food and/or beverage applications.

In one embodiment, the compositions of the present invention include 30 to 97% by weight of the thermoplastic polymer, from 3 to 70% by weight of the self-lubricating polymer, such as PTFE, and a fluoride scavenger up to 5.0% weight of the PTFE or up to 5.0% weight of the total composite. In another embodiment, the compositions of the present invention include 50 to 90% by weight of the thermoplastic polymer, from 10 to 50% by weight of the self-lubricating polymer, such as PTFE, and a fluoride scavenger up to 1.0% weight of the PTFE or up to 3.0% weight of the total composite. In one embodiment, the thermoplastic polymer (i.e., the base polymer) is present in the range from 97 to 50% by weight exclusive of any fillers.

The compositions as described herein are useful in any application wherein the composition will be used in higher temperature environments. The compositions are especially useful in electronic applications wherein low fluoride levels are beneficial. Examples of such applications include, but are not limited to, hard disk drive internal components. In addition, the compositions disclosed herein are useful in medical or food or beverage applications where the composition may not necessarily be used in or exposed to high temperature environments, but low fluoride levels are still beneficial.

The present invention is further illustrated by the following non-limiting examples.

EXAMPLES

Examples 1-8

In Examples 1-8, these examples were conducted to demonstrate the low fluoride ion level achieved when a fluoride scavenger is added to the thermoplastic base resin/PTFE blend. In these examples, the base resin used was polyetherimide (ULTEM™). Calcium stearate, calcium carbonate, or calcium oxide was added to the base resin, PEI. About 0.1 to about 2.0% weight of the fluoride scavenger was diluted by the addition of PEI powder. The mixture was added through the feed throat into the twin-screw extruder. The PTFE was present in an amount from about 3 to about 50% weight. The PTFE was added either from the feed throat as a preblend mixture with the PEI/fluoride scavenger blend or was added separately downstream through a side feeder. In this example, the barrel temperature was set between 340° C. to 370° C. The compound was quenched by deionized water and the pellets were collected for leachable ionic chromatography (IC) evaluation and testing. Test bars were molded at a barrel temperature range from 340° C. to 370° C. These bars were also collected, evaluated, and tested by leachable IC. Results for both showed the fluoride ion level only at several ug/g, which was significantly reduced as compared to conventional PEI/PTFE compounds.

In Examples 1-8, a preblend mixture of PEI and calcium stearate in the ratios of 84.9 to 0.1% weight was used. The mixture was fed into a 37 mm, 11 barrel twin screw extruder. PTFE in the amount of 15% weight was fed through a side feeder from barrel 7 downstream. The barrel temperature was set to 370° C. and the output of the screw was set up at 35 kg/hr with screw speeds of about 300 to about 350 rpm. The composite was compounded into a water bath with deionized water for quenching and then pelletized. The pellet sample was collected with a clean glass, aluminum foil gasket sealable jar for leachable IC analysis. The glass jar was pre-rinsed with deionized water and dried. The pellets were dried before being injection molded into ASTM standard Izod bars, also for leachable IC evaluation and testing. The barrel temperature was set to 370° C. The pellets or bars are treated with deionized water at 85 deg C. for 3 hrs, and the water was used for IC testing to evaluate the leachable fluoride ion level.

For comparison, a formulation like the one described above, but without calcium stearate, was also compounded and sampled under the same processing conditions for evaluation and testing.

Table 1 shows the formulations for Examples 1 to 8 while Table 2 shows the process and profile settings for the compounding and molding. The PEI used was supplied from GE Plastics. The Zonyl MP irradiated PTFE grades were supplied by Dupont, while the non-irradiated PTFE was supplied from KITAMURA. Calcium stearate was obtained from Ferro. Table 1 lists the individual grade information.

TABLE 1

| Item Description | Unit | Sample Number | | | | | | | |
|---|---|---|---|---|---|---|---|---|---|
| | | 1 | 2 | 3 | 4 | 5 | 6 | 7 | 8 |
| GE Plasics ULTEM* POLYMER 1010 | % | 85 | 85 | 85 | 85 | 85 | 85 | 85 | 85 |
| Ferro Ca Stearate 114-40 | % | | | | 0.1 | | 0.1 | 0.1 | 0.1 |
| Dupont Zonyl* MP1300 | % | 15 | | | 15 | | | | |
| Dupont Zonyl* MP1600 | % | | 15 | | | | 15 | | |
| Dupont Zonyl* MP1500 | % | | | 15 | | | | 15 | |
| KITAMURA KT 300M | % | | | | | 15 | | | 15 |

TABLE 2

| Item | unit | Settings |
|---|---|---|
| Compounding profile @ 37 mm Toshiba twin screw extruder | | |
| Output | kg/hr | 30~40 |
| rpm | rpm | 300~350 |
| Barrel temp. | | |
| Barrel 1 | deg C. | 170 |
| Barrel 2 | deg C. | 250 |
| Barrel 3 | deg C. | 340 |
| Barrel 4 | deg C. | 340~370 |
| Barrel 5 | deg C. | 340~370 |
| Barrel 6 | deg C. | 340~370 |
| Barrel 7 | deg C. | 340~370 |
| Barrel 8 | deg C. | 340~370 |
| Barrel 9 | deg C. | 340~370 |
| Barrel 10 | deg C. | 340~370 |
| Barrel 11 | deg C. | 340~370 |
| Die head | deg C. | 340~370 |
| Vaccum | Mpa | 340~370 |
| Side feeder zone | N/A | 7 |
| Side feeder rpm | rpm | 200 |
| Quench water | N/A | DI water |
| Mold tool | | Axxicom Izod insert |

TABLE 2-continued

| Item | unit | Settings |
|---|---|---|
| Molding Profile @ ES3000 molding matchine | | |
| Extruder setting | | |
| rpm | rpm | 80 |
| Injection speed | mm/sec | 100 |
| Back pressure | Mpa | 800 |
| max. pressure | Mpa | 1000 |
| Melt temp. | | |
| 1 | deg C. | 310 |
| 2 | deg C. | 340 |
| 3 | deg C. | 365 |
| Nozzle | deg C. | 370 |
| Mold temp | deg C. | 370 |
| Cooling time | sec | 20 |

Tables 3.1 and 3.2 show comparisons of the IC testing for pellets and bars, respectively. A significant drop in the fluoride ion level can be seen for both the pellets and the molded test bars containing a fluoride scavenger.

TABLE 3.1

IC test data for Pellets

| | Sample | Cation (ppb) | Anions (ppb) | | | | | |
|---|---|---|---|---|---|---|---|---|
| Sample Number | Description | [NH4]+ | F- | Cl- | [NO2]- | [SO4]2- | [Br]- | [NO3]- | [PO4]3- |
| | | 7.2 | ND | 3.4 | ND | 2.8 | ND | ND | ND |
| 1 | MP1300 | 6.2 | 714.4 | 13.3 | ND | 42.0 | ND | 5.4 | ND |
| 2 | MP1600 | 6.5 | 184.9 | 11.2 | ND | 33.6 | ND | ND | ND |
| 3 | MP1500 | 8.1 | 95.4 | 32.3 | ND | 148.8 | ND | 7.8 | ND |
| 4 | MP1300ST | 6.2 | 4.7 | 9.9 | ND | 22.4 | ND | ND | ND |
| 5 | KT300 | 11.1 | 8.2 | 14.6 | ND | 28.0 | ND | ND | ND |
| 6 | MP1600ST | 7.2 | 2.2 | 8.2 | ND | 21.3 | ND | ND | ND |
| 7 | MP1500ST | 6.8 | 4.7 | 15.1 | ND | 45.9 | ND | 4.7 | ND |
| 8 | KT300-ST | 8.8 | 2.0 | 15.9 | ND | 25.7 | ND | ND | ND |

TABLE 3.2

IC test data for Bars

| | Sample | Cation (ppb) | Anions (ppb) | | | | | |
|---|---|---|---|---|---|---|---|---|
| Sample Number | Description | [NH4]+ | F- | Cl- | [NO2]- | [SO4]2- | [Br]- | [NO3]- | [PO4]3- |
| 1 | MP1300 | 7 | 19 | 126 | ND | 57 | ND | 68 | ND |
| 2 | MP1600 | 5 | 9 | 9 | ND | 8 | ND | ND | ND |
| 3 | MP1500 | 7 | 4 | 11 | ND | 10 | ND | 5 | ND |
| 4 | MP1300ST | 5 | ND | 12 | ND | 8 | ND | 6 | ND |
| 5 | KT300 | 5 | ND | 7 | ND | 4 | ND | ND | ND |
| 6 | MP1600ST | 7 | ND | 8 | ND | 6 | ND | ND | ND |
| 7 | MP1500ST | 7 | ND | 9 | ND | 12 | ND | 5 | ND |
| 8 | KT300-ST | 6 | ND | 11 | ND | 8 | ND | 4 | ND |

ND = non detectable

Table 4 shows physical property comparisons with regard to density, impact strength and wear properties. As can be seen, no significant differences were identified in the samples with the fluoride scavenger versus the control formulation without the fluoride scavenger. For the wear properties, all values are within the acceptable range of variance.

TABLE 4

| Test | Unit | \multicolumn{8}{c|}{Sample code} |
| --- | --- | --- | --- | --- | --- | --- | --- | --- | --- |
| | | 1 | 4 | 3 | 7 | 2 | 6 | 5 | 8 |
| Impact | J/M | 44.5 | 46.3 | 60.7 | 62.1 | 28.7 | 37.7 | 42.4 | 39.7 |
| SG | g/cm^3 | 1.36 | 1.36 | 1.36 | 1.36 | 1.35 | 1.36 | 1.36 | 1.35 |
| Wear Factor | K * E10 | 44.5 | 189 | 425 | 120 | N/A | N/A | N/A | N/A |
| Wear Friction | | 0.36 | 0.406 | 0.349 | 0.327 | N/A | N/A | N/A | N/A |
| Wear Temp. | deg F. | 133.4 | 133.2 | 123.4 | 123.2 | N/A | N/A | N/A | N/A |

In another example, either polyphenylene ether/polystyrene (available from GE under the name NORYL™) or polycarbonate (available from GE under the name LEXAN™) was used as the base resin along with PTFE and a fluoride scavenger, specifically, calcium stearate. The PTFE was supplied by Dupont, and the calcium stearate was supplied by Ferro. Specific grade information may be found in Table 6. Table 5 shows the process conditions for these blends.

TABLE 5

Compounding profile @ 37 mm Toshiba twin screw extruder

| Item | unit | Settings Noryl matrix | PC matrix |
| --- | --- | --- | --- |
| Output | kg/hr | 30~35 | 30~35 |
| rpm | rpm | 200~350 | 200~350 |
| Barrel temp. | | | |
| Barrel 1 | deg C. | 150 | 150 |
| Barrel 2 | deg C. | 230 | 250 |
| Barrel 3 | deg C. | 250 | 260 |
| Barrel 4 | deg C. | 270 | 270 |
| Barrel 5 | deg C. | 270 | 280 |
| Barrel 6 | deg C. | 270 | 280 |
| Barrel 7 | deg C. | 270 | 280 |
| Barrel 8 | deg C. | 270 | 280 |
| Barrel 9 | deg C. | 270 | 285 |
| Barrel 10 | deg C. | 270 | 285 |
| Barrel 11 | deg C. | 270 | 285 |

TABLE 5-continued

Compounding profile @ 37 mm Toshiba twin screw extruder

| Item | unit | Settings Noryl matrix | PC matrix |
| --- | --- | --- | --- |
| Die head | deg C. | 280 | 290 |
| Vaccum | Mpa | 350~370 | 350~370 |
| Side feeder Zon | N/A | 7 | 7 |
| Side feeder rpm | rpm | 200 | 200 |
| Quench Water | N/A | DI Water | DI Water |

Table 6 shows the formulation for the polyphenylene ether/polystyrene blend samples. As can be seen from the table, the presence of calcium stearate in the amount of about 0.1 weight % (sample 10) significantly reduced the leachable fluoride level in the pellets. Use of calcium stearate in amounts up to 0.5% (sample 11) will not change the mechanical properties or melt rheology. Table 6 also shows that the presence of calcium carbonate aids in controlling the fluoride level at levels of about 0.5% to about 2% without decreasing the mechanical properties. As can be seen from the table, the substitution of glass fiber or mineral fillers for the fluoride scavenger lowers the fluoride level as compared to the control, but the level is significantly higher than those with the addition of calcium stearate or calcium carbonate and not low enough to meet the specifications for the semiconductor industry.

TABLE 6

| | | | \multicolumn{6}{c|}{Sample Code} |
| --- | --- | --- | --- | --- | --- | --- | --- | --- |
| | | | 9 | 10 | 11 | 12 | 13 | 14 |
| | | | \multicolumn{6}{c|}{Sample Discription} |
| Item Code | Item Description | Unit | Control | 0.1% Calcium stearate | 0.5% Calcium stearate | 0.5% CaCO3 | 20% GF filled Noryl | 3% Wallostanite Filled |
| 1 | GE Plastics Noryl 731 | % | 85 | 84.9 | 84.5 | 84.5 | 65 | 62 |
| 2 | PTFE Dupont Zonyl MP 1300 | % | 15 | 15 | 15 | 15 | 15 | 15 |
| 3 | Ferro Ca stearate 114-40 | % | | 0.1 | 0.5 | | | |
| 4 | CaCO3 | % | | | | 0.5 | | |
| 5 | Wollastonite OCF Chopped | % | | | | | | 3 |
| 6 | GF 118Y-14P | % | | | | | 20 | 20 |
| | \multicolumn{8}{c|}{Key properties} |
| | Flexural Modulus | MPa | 2020 | 2020 | 2030 | 2040 | 4630 | 4870 |
| | Flexural Stress@Break | MPa | 69.2 | 70.8 | 71.5 | 71.2 | 114 | 110 |
| | Deflection temp | ° C. | 125 | 126 | 125 | 126 | 141 | 144 |
| | Impact Strength | J/m | 115 | 104 | 103 | 95.7 | 95.7 | 78.8 |
| | IC-Leachable fluoride-pellet | ug/g | 323 | 6 | 10 | 14 | 90 | 77 |

Table 7 shows samples utilizing polycarbonate, PTFE, and calcium stearate. The base polymer, polycarbonate, was supplied from GE Plastics, the PTFE was supplied from Dupont, and the calcium stearate was supplied from Ferro. Specific grade information may be found in Table 7

Polycarbonate is sensitive to the presence of calcium stearate because in combination with moisture, chain reorganization may be initiated resulting in a significant decrease in mechanical properties. In this example, calcium stearate was used in an amount of 0.05%, which was sufficient to reduce the leachable fluoride ion content, but not decrease the physical properties. In further studies, we determined that loadings of calcium stearate in range 0.02% to 0.05% effectively reduced the fluoride ion content, in 15% PTFE formulations, without affecting the PC molecular weight. However, a loading of 0.1% calcium stearate will affect the PC significantly.

Table 7 also shows that while the addition of 10% chopped glass fibers decreases the leachable fluoride level as compared to the control, the level is not reduced enough to meet specifications of the semiconductor industry. Only when calcium stearate is added to the blend does the leachable fluoride level fall within the specifications.

TABLE 7

| S. No | Item Description | Unit | Sample code | | | |
| --- | --- | --- | --- | --- | --- | --- |
| | | | 15 | 16 | 17 | 18 |
| 1 | GEP Lexan 121R-111 | % | 85 | 75 | 84.95 | 74.95 |
| 2 | PTFE Dupont Zonyl MP1300 | % | 15 | 15 | 15 | 15 |
| 3 | CALCIUM STEARATE Ferro Ca Stearate 114-40 | % | | | 0.05 | 0.05 |
| 4 | Chopped GF fiber OCF 473-14P | % | | 10 | | 10 |
| | | Key properties | | | | |
| | Mw | Daltons | 47726 | 46784 | 47767 | 45414 |
| | Mn | Daltons | 18185 | 17816 | 18149 | 17530 |
| | D | — | 2.62 | 2.63 | 2.63 | 2.59 |
| | Impact Strength-Avg | J/m | 112 | 83.7 | 110 | 74.4 |
| | MVR-Ind | $cm^3$/10 min | 6.019 | 4.183 | 5.882 | 4.268 |
| | IC-Leachable fluoride-pellet | ug/g | 652 | 198 | 19 | 68 |

The results shown in the foregoing tables indicate that use of a fluoride scavenger in the range of about 0.05 weight % to about 5 weight % in different polymer blends is effective in reducing the leachable fluoride ion levels without compromising the physical properties. Thermoplastic blends containing a fluoride scavenger are able to meet the cleanliness specifications required by the semiconductor industry, making this an economic and efficient method of generating a low fluoride level blend.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A thermoplastic composition, comprising:
    a base polymer; wherein said base polymer is polyimide, polyphenylene sulfide, polyphenylene ether, polyethersulfone, polysulfone, polyetheretherketone, polycarbonate, polyphenylene oxide, polyester, polyamide, polystyrene, mixtures, copolymers, reaction products, or blends comprising at least one of the foregoing polymers
    an irradiated fluoropolymer; wherein the fluoropolymer is present in the range from 3 to 50% by weight of the thermoplastic composition; and
    a fluoride scavenger; wherein the fluoride scavenger is an organic calcium salt, calcium oxide, minerals with calcium oxide; or a mixture comprising at least one of the foregoing fluoride scavengers; wherein the fluoride scavenger is effective to produce a fluoride level of below 40 micrograms per gram of the thermoplastic composition; and wherein said composition has a lower fluoride ion level relative to a composition consisting of the base polymer and the fluoropolymer.

2. The composition of claim 1 wherein the base polymer is polyetherimide.

3. The composition of claim 1 wherein the base polymer is a polyphenylene ether/polystyrene blend.

4. The composition of claim 1 wherein the base polymer is polycarbonate.

5. The composition of claim 1 wherein the fluoropolymer is polytetrafluoroethylene (PTFE).

6. The composition of claim 1 wherein the organic calcium salt is calcium stearate.

7. The composition of claim 1 wherein the base polymer is present in the range from 97 to 50% by weight exclusive of any fillers.

8. The composition of claim 1 wherein the fluoride scavenger is present in the range from 0.01 to 5% by weight of the thermoplastic composition.

9. The composition of claim 1 wherein the fluoride level is below 10 micrograms per gram of the thermoplastic composition.

10. An article comprising the composition of claim 1.

11. A method comprising:
    extruding the thermoplastic composition of claim 1;
    quenching the composition in a deionized water bath; and
    pelletizing the composition.

12. The method of claim 11 further comprising the steps of:
    drying the pellets; and
    molding the pellets into a shaped article.

13. The method of claim 12 wherein the fluoropolymer is polytetrafluoroethylene (PTFE).

14. The method of claim 12 wherein the base polymer is present in the range from 97 to 50% by weight exclusive of any fillers, the fluoropolymer is present in the range from 3 to 50% by weight, and the fluoride scavenger is present in the range from 0.01 to 5% by weight.

15. The method of claim 12 wherein the fluoride level is below 40 ug/g.

* * * * *